United States Patent
Tsukagoshi et al.

(10) Patent No.: US 12,244,207 B2
(45) Date of Patent: Mar. 4, 2025

(54) ROTATING ELECTRICAL MACHINE

(71) Applicant: NISSAN MOTOR CO., LTD., Yokohama (JP)

(72) Inventors: Yuki Tsukagoshi, Kanagawa (JP); Yasuyuki Kubota, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 18/280,601

(22) PCT Filed: Mar. 8, 2021

(86) PCT No.: PCT/JP2021/009083
§ 371 (c)(1),
(2) Date: Sep. 6, 2023

(87) PCT Pub. No.: WO2022/190183
PCT Pub. Date: Sep. 15, 2022

(65) Prior Publication Data
US 2024/0039361 A1 Feb. 1, 2024

(51) Int. Cl.
*H02K 5/20* (2006.01)
(52) U.S. Cl.
CPC .................... *H02K 5/203* (2021.01)
(58) Field of Classification Search
CPC ............ H02K 5/20; H02K 5/203; H02K 9/19; H02K 9/193; H02K 9/197
See application file for complete search history.

(56) References Cited

U.S. PATENT DOCUMENTS

| | | | |
|---|---|---|---|
| 2010/0001597 A1 | 1/2010 | Noll | |
| 2012/0111543 A1* | 5/2012 | Sakaguchi | B60K 1/02 165/104.31 |
| 2013/0263899 A1 | 10/2013 | Dirnberger et al. | |
| 2014/0145527 A1 | 5/2014 | Sakaguchi et al. | |

(Continued)

FOREIGN PATENT DOCUMENTS

| | | |
|---|---|---|
| CN | 103840609 A | 6/2014 |
| CN | 111226379 A | 6/2020 |

(Continued)

OTHER PUBLICATIONS

Nakasugi (JP 2017225265 A) English Translation (Year: 2017).*

*Primary Examiner* — Tulsidas C Patel
*Assistant Examiner* — Robert E Mates
(74) *Attorney, Agent, or Firm* — Foley & Lardner LLP (57) ABSTRACT

A rotating electrical machine includes a cylindrical housing having a flow path configured to allow a refrigerant to flow therethrough, an inlet configured to allow the refrigerant to flow into the flow path, and an outlet configured to allow the refrigerant to flow out of the flow path. The flow path being formed so as to spirally surround a circumferential surface of the housing. The flow path includes: a first flow path that is formed along one end surface of the housing and formed such that a width along the circumferential surface increases along a flow direction of the refrigerant from the inlet; and a second flow path that is formed along the other end surface of the housing and formed such that a width along the circumferential surface decreases toward the outlet along the flow direction of the refrigerant.

8 Claims, 7 Drawing Sheets

(56) References Cited

U.S. PATENT DOCUMENTS

| | | | |
|---|---|---|---|
| 2016/0028292 A1* | 1/2016 | Lin | ........................ H02K 5/203 |
| | | | 310/64 |
| 2019/0131851 A1* | 5/2019 | Herb | ....................... H02K 9/197 |
| 2020/0284338 A1 | 9/2020 | Suyama et al. | |

FOREIGN PATENT DOCUMENTS

| | | | | |
|---|---|---|---|---|
| CN | 111247724 A | 6/2020 | | |
| CN | 212588185 U | 2/2021 | | |
| EP | 1 810 389 B1 | 12/2010 | | |
| EP | 3112713 A1 * | 1/2017 | ........... | B23Q 11/127 |
| JP | 2014-505821 A | 3/2014 | | |
| JP | 2017225265 A * | 12/2017 | | |
| WO | WO-2015/098328 A1 | 3/2017 | | |
| WO | WO-2019/022116 A1 | 1/2019 | | |
| WO | WO-2019/022123 A1 | 1/2019 | | |

* cited by examiner

ROTATING ELECTRICAL MACHINE

TECHNICAL FIELD

The present invention relates to a rotating electrical machine including a housing having a refrigerant passage through which a refrigerant flows.

BACKGROUND ART

WO 2015/098328 describes that when a passage through which a cooling liquid for cooling a rotating electrical machine flows is formed in a housing, the passage is formed by a circumferential passage along an outer periphery of a cylindrical housing and an oblique passage connecting each circumferential passage. In particular, the document describes that a width of the oblique passage should be the same as that of the circumferential passage in order to suppress an increase in pressure loss.

SUMMARY OF INVENTION

When a flow path (passage) through which a refrigerant flows is formed in a housing of a rotating electrical machine, it is necessary to particularly consider a relative positional relation between an inlet through which the refrigerant flows into the flow path and an outlet through which the refrigerant flows out from the flow path.

For example, as in the housing described in the above document, when an inlet and an outlet of the refrigerant are located at substantially the same position in a circumferential direction of the housing, a flow path of a refrigerant can be formed to cover substantially an entire circumferential surface of the housing.

However, the rotating electrical machine is used by being incorporated in a drive unit or the like that drives a vehicle. Therefore, for example, the arrangement of the inlet and the outlet of the refrigerant may be limited by an arrangement relation of other members constituting the drive unit. That is, the inlet and the outlet of the refrigerant may be arranged at positions separated from each other in the circumferential direction of the housing. In this case, depending on an angular range in which the inlet and outlet of the refrigerant are spaced apart from each other, a portion without a flow path of the refrigerant is generated on the circumferential surface of the housing. For example, when the inlet and outlet of the refrigerant are shifted by 180 degrees in the circumferential direction of the housing, a portion without a flow path of the refrigerant is generated over half the circumference at an end of the housing. When there is such a portion without a flow path, a problem that the rotating electrical machine is not sufficiently cooled occurs.

An object of the present invention is to provide a rotating electrical machine formed with a flow path of a refrigerant in a housing, in which necessary cooling performance can be obtained regardless of a positional relation between an inlet and an outlet of the refrigerant.

A rotating electrical machine according to one aspect of the present invention includes a cylindrical housing having a flow path configured to allow a refrigerant to flow therethrough, an inlet configured to allow the refrigerant to flow into the flow path, and an outlet configured to allow the refrigerant to flow out of the flow path, the flow path being formed so as to spirally surround a circumferential surface of the housing, wherein the flow path includes: a first flow path that is formed along one end surface of the housing and formed such that a width along the circumferential surface increases along a flow direction of the refrigerant from the inlet; and a second flow path that is formed along the other end surface of the housing and formed such that a width along the circumferential surface decreases toward the outlet along the flow direction of the refrigerant.

DESCRIPTION OF EMBODIMENTS

Hereinafter, embodiments of the present invention will be described with reference to the accompanying drawings.

Figure 1:
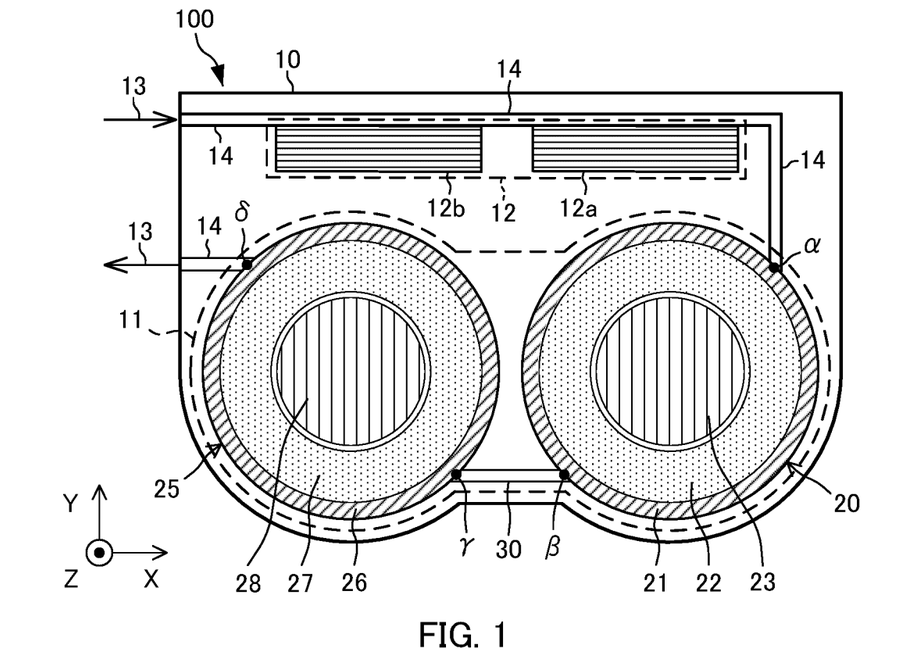
FIG. 1 is a schematic cross-sectional view of a drive unit.

FIG. 1 is a schematic cross-sectional view of a drive unit 100. The drive unit 100 is a unit for directly or indirectly controlling driving of a vehicle (not shown) such as an electric vehicle or a hybrid vehicle using a rotating electrical machine 11. The direct drive control using the rotating electrical machine 11 is, for example, a control mode in which a torque generated by the rotating electrical machine 11 is converted into a driving force of the vehicle. The indirect drive control using the rotating electrical machine 11 is, for example, a control mode in which the rotating electrical machine 11 is used for power generation, and a part or all of electric power generated by the power generation is used to generate a driving force of the vehicle. The drive unit 100 of the present embodiment is mounted on a series hybrid electric vehicle. Therefore, the drive unit 100 controls the driving of the vehicle directly and indirectly.

As shown in FIG. 1, the drive unit 100 includes the rotating electrical machine 11 and an inverter 12 that controls an operation of the rotating electrical machine 11 in an outer housing 10. In addition to the rotating electrical machine 11 and the inverter 12, the drive unit 100 is configured integrally with members (not shown) such as gears constituting a speed reducer and a rotation sensor.

The outer housing 10 is a housing that forms an outer shell of the drive unit 100. The rotating electrical machine 11, the inverter 12, and the like are accommodated in the outer housing 10, thereby being integrated as the drive unit 100. A flow path (hereinafter, referred to as a refrigerant flow path) 14 through which a refrigerant 13 that cools a heating element such as the rotating electrical machine 11 and the inverter 12 flows is provided in the outer housing 10. The refrigerant 13 is a fluid such as a liquid or a gas supplied for cooling, and is, for example, cooling water, other cooling liquid or air, and the like. The refrigerant 13 flows through the refrigerant flow path 14 and the like, thereby cooling each part accommodated in the outer housing 10, such as the rotating electrical machine 11, the inverter 12, and other heating elements (not shown). In the present embodiment, the refrigerant 13 is a cooling liquid that circulates between radiators (not shown).

The rotating electrical machine 11 is a motor, a generator, or a motor generator that operates as a motor and a generator. The rotating electrical machine 11 may include two or more motors that operate as a motor, a generator, or a motor generator. In the present embodiment, the rotating electrical machine 11 includes two motors, that is, a first motor 20 and a second motor 25. For this reason, the inverter 12 includes a first inverter 12a that controls the first motor 20 and a second inverter 12b that controls the second motor 25.

The first motor 20 is a driving motor (electric motor). Therefore, the vehicle equipped with the drive unit 100 travels by converting a torque generated by the first motor 20 into a driving force. Electric power for driving the first motor 20 is supplied from a battery (not shown). The first motor 20 includes an inner housing 21, a stator 22, and a rotor 23.

The inner housing 21 is a cylindrical member that fixes the stator 22 by a method such as shrink fitting. In the present embodiment, the inner housing 21 has a cylindrical shape. The inner housing 21 includes a refrigerant flow path 24 (see FIG. 2 and the like) that communicates with the refrigerant flow path 14 of the outer housing 10 therein. That is, the refrigerant flow path 24 is a flow path (passage) through which the refrigerant 13 flows. A structure of the inner housing 21 and a structure of the refrigerant flow path 24 of the inner housing 21 (hereinafter referred to as the refrigerant flow path 24 of the first motor 20) will be described in detail later.

The rotor 23 is attached to the outer housing 10 and is inserted into a central portion of the stator 22 when the drive unit 100 is formed. The rotor 23 is rotatable with respect to the inner housing 21 and the stator 22 even after being inserted into the stator 22. Since the stator 22 is a unit through which a current flows to control the first motor 20, the stator 22 is at least one of heat generation factors of the first motor 20.

The second motor 25 is a power generation motor (generator). The second motor 25 is connected to an engine (internal combustion engine) (not shown) and is driven by the engine. The electric power generated by the second motor 25 is accumulated in a battery that supplies electric power to the first motor 20. The second motor 25 can consume the electric power of the battery by idling.

The second motor 25 is different in use from the first motor 20, but has the same basic structure as the first motor 20. That is, the second motor 25 includes an inner housing 26, a stator 27, and a rotor 28. The inner housing 26 is a cylindrical member that fixes the stator 27 by a method such as shrink fitting, and has a cylindrical shape in the present embodiment. The inner housing 26 includes a refrigerant flow path 29 (see FIG. 12 and the like) that communicates with the refrigerant flow path 14 of the outer housing 10 therein. That is, the refrigerant flow path 29 is a flow path through which the refrigerant 13 flows. The refrigerant flow path 29 of the inner housing 26 (hereinafter, referred to as the refrigerant flow path 29 of the second motor 25) has substantially the same basic structure as the refrigerant flow path 24 of the inner housing 21. A structure of the refrigerant flow path 29 of the second motor 25 will be described in detail later together with a coupling structure of the first motor 20 and the second motor 25. The rotor 28 is attached to the outer housing 10 and is rotatable even after being inserted into the stator 27. Since the stator 27 is a unit through which a current flows to control the second motor 25, the stator 27 is at least one of heat generation factors of the second motor 25.

The inner housing 21 of the first motor 20 and the inner housing 26 of the second motor 25 are integrated by being coupled with a coupling pipe 30. For this reason, the inner housing 21 of the first motor 20 and the inner housing 26 of the second motor 25 as a whole constitute an inner housing of the rotating electrical machine 11. That is, the inner housing of the rotating electrical machine 11 includes a first housing and a second housing. The first housing is the inner housing 21 of the first motor 20, accommodates the stator 22 as a first stator and the rotor 23 as a first rotor, and has the refrigerant flow path 24. The second housing is the inner housing 26 of the second motor accommodates the stator 27 as a second stator and the rotor 28 as a second rotor, and has the refrigerant flow path 29.

In addition to integrating the inner housings 21 and 26 as described above, the coupling pipe 30 couples the refrigerant flow path 24 of the first motor 20 and the refrigerant flow path 29 of the second motor 25. In the present embodiment, the refrigerant 13 flowing into the outer housing 10 flows into the refrigerant flow path 24 of the first motor 20 after passing through the refrigerant flow path 14 to cool the inverter 12. Thereafter, the refrigerant 13 flows through the refrigerant flow path 24 of the first motor 20 and flows out to the coupling pipe 30. Therefore, a connection portion between the refrigerant flow path 14 of the outer housing 10 and the first motor 20 is an inlet (hereinafter referred to as an inlet α) of the refrigerant 13 in the refrigerant flow path 24 of the first motor 20. A connection portion between the coupling pipe 30 and the first motor 20 is an outlet (hereinafter referred to as an outlet β) of the refrigerant 13 in the refrigerant flow path 24 of the first motor 20. That is, in the refrigerant flow path 24 of the first motor 20, the inlet α is an introduction port of the refrigerant 13, and the outlet β is a discharge port of the refrigerant 13.

The refrigerant 13 flows into the refrigerant flow path 29 of the second motor 25 through the coupling pipe 30, flows through the refrigerant flow path 29 of the second motor 25, and then flows out to the refrigerant flow path 14 of the outer housing 10. Therefore, a connection portion between the coupling pipe 30 and the second motor 25 is an inlet (hereinafter referred to as an inlet γ) of the refrigerant 13 in the refrigerant flow path 29 of the second motor 25. A connection portion between the refrigerant flow path 14 of the outer housing 10 and the second motor 25 is an outlet (hereinafter referred to as an outlet δ) of the refrigerant 13 in the refrigerant flow path 29 of the second motor 25. That is, in the refrigerant flow path 29 of the second motor 25, the inlet γ is an introduction port of the refrigerant 13, and the outlet δ is a discharge port of the refrigerant 13.

That is, the coupling pipe 30 linearly couples the outlet β of the inner housing 21 and the inlet γ of the inner housing 26 without waste. Accordingly, the coupling pipe 30 connects the refrigerant flow path 24 of the first motor 20 and the refrigerant flow path 29 of the second motor 25.

In the present embodiment, rotation axes of the first motor 20 and the second motor 25 are parallel to each other. As shown in FIG. 1, a direction of the rotation axes of the first motor 20 and the second motor 25 is defined as a Z direction, and an X direction and a Y direction are defined so as to form a right-handed system with reference to the Z direction. Further, as shown in FIG. 1, for convenience of explanation, the refrigerant flow path 14 connected to the first motor 20 and the refrigerant flow path 14 connected to the second motor 25 are parallel to each other in the vicinity of the connection portions thereof. A connection direction of the refrigerant flow path 14 to the first motor 20 and the second motor 25 is defined as the Y direction.

[Structure of Inner Housing and Refrigerant Flow Path]

Figure 2:
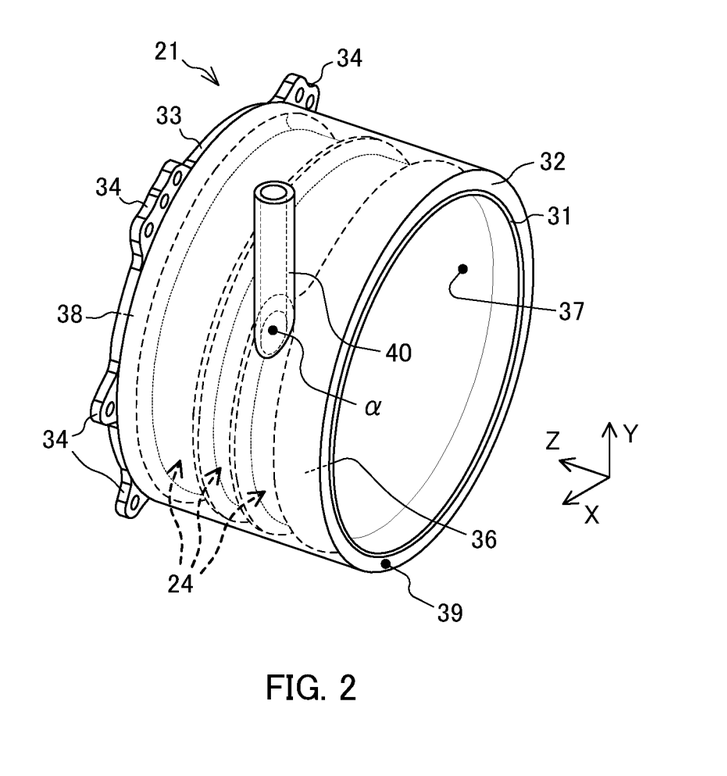
FIG. 2 is a perspective view of a housing to which a stator is fixed.

FIG. 2 is a perspective view of the inner housing 21. Although FIG. 2 shows the inner housing 21 of the first motor 20, the inner housing 26 of the second motor 25 also has the same structure. As shown in FIG. 2, the inner housing 21 of the first motor 20 has a double pipe structure including an inner pipe 31 and an outer pipe 32, and the refrigerant flow path 24 of the first motor 20 is formed between the inner pipe 31 and the outer pipe 32.

The inner pipe 31 is a substantially cylindrical member, and has a flange portion 33 at one end. The flange portion 33 is provided with a fastening portion 34. Therefore, the flange portion 33 constitutes a mounting surface to the outer housing 10. The flange portion 33 also functions as a positioning member of the outer pipe 32. That is, when the outer pipe 32 is attached to the inner pipe 31 by engagement, screwing, or other methods, an end of the outer pipe 32 abuts against the flange portion 33 of the inner pipe 31. Accordingly, a relative position between the inner pipe 31 and the outer pipe 32 in the Z direction is determined. The fastening portion 34 is a portion of the flange portion 33 that has screw holes for fastening the inner housing 21 to the outer housing 10. The stator 22 is accommodated and fixed in the inner pipe 31.

Hereinafter, among circumferential surfaces of the inner pipe 31, a circumferential surface in contact with the stator 22 is referred to as an inner circumferential surface, and a circumferential surface in contact with the outer pipe 32 is referred to as an outer circumferential surface. Similarly, among circumferential surfaces of the outer pipe 32, a circumferential surface on the outer circumferential surface side of the inner pipe 31 is referred to as an inner circumferential surface, and a circumferential surface forming an outer periphery of the inner housing 21 is referred to as an outer circumferential surface. For convenience of explanation, in the inner circumferential surface of the inner pipe 31, the inner circumferential surface on the positive side in the X direction is referred to as a right inner circumferential surface 36, and the inner circumferential surface on the negative side in the X direction is referred to as a left inner circumferential surface 37. A surface at the end of the inner housing 21 is referred to as an end surface. In the present embodiment, for convenience, an end surface of the inner pipe 31 on the positive side in the Z direction where the flange portion 33 is provided is referred to as "one end surface 38", and an end surface on the negative side in the Z direction is referred to as "the other end surface 39".

The outer pipe 32 is attached to an outside of the inner pipe 31 so as to cover the outer circumferential surface of the inner pipe 31. Further, when the outer pipe 32 is attached to the inner pipe 31, the inner circumferential surface of the outer pipe 32 abuts against the outer circumferential surface of the inner pipe 31 except for a portion where the refrigerant flow path 24 is formed. For this reason, the refrigerant flow path 24 is kept watertight and airtight to the extent that the refrigerant 13 does not leak at least. The outer pipe 32 has a connecting pipe 40 connected to the refrigerant flow path 14 of the outer housing 10 at the inlet α of the refrigerant 13. The connecting pipe 40 may be referred to as a bulge.

Figure 3:
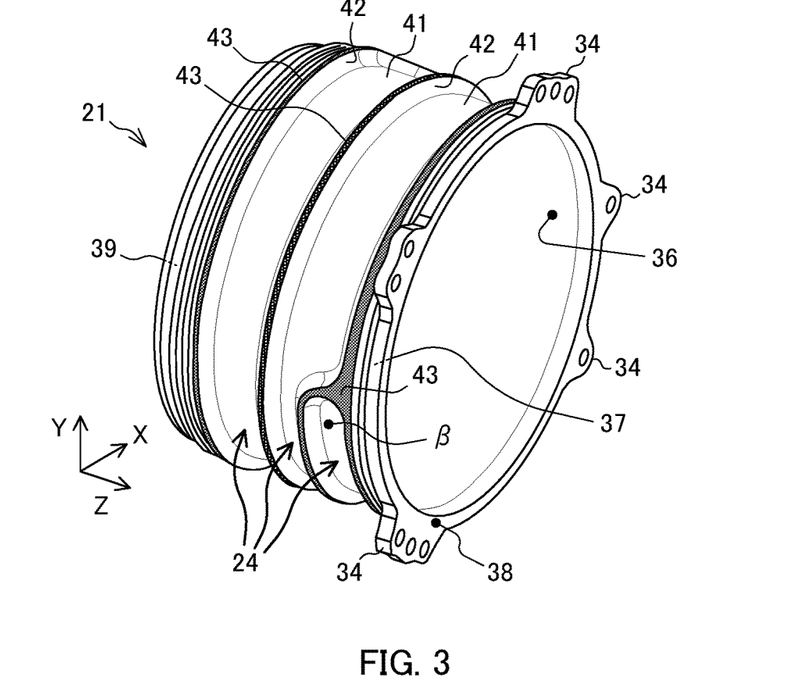
FIG. 3 is a perspective view of an inner pipe.

FIG. 3 is a perspective view of the inner pipe 31. The inner pipe 31 has a series of grooves 41 along the outer circumferential surface. The grooves 41 are formed to surround the outer circumferential surface of the inner pipe 31. Adjacent ones of the grooves 41 are separated by wall portions 42 due to the encirclement or the like. The wall portions 42 separate the one end surface 38 and the other end surface 39 from the grooves 41. Top portions 43 (ridge portions) of the wall portions 42 abut against the inner circumferential surface of the outer pipe 32. When the outer pipe 32 is attached to the inner pipe 31, the refrigerant flow path 24 is formed by the inner circumferential surface of the outer pipe 32, the grooves 41, and the wall portions 42.

Figure 4:
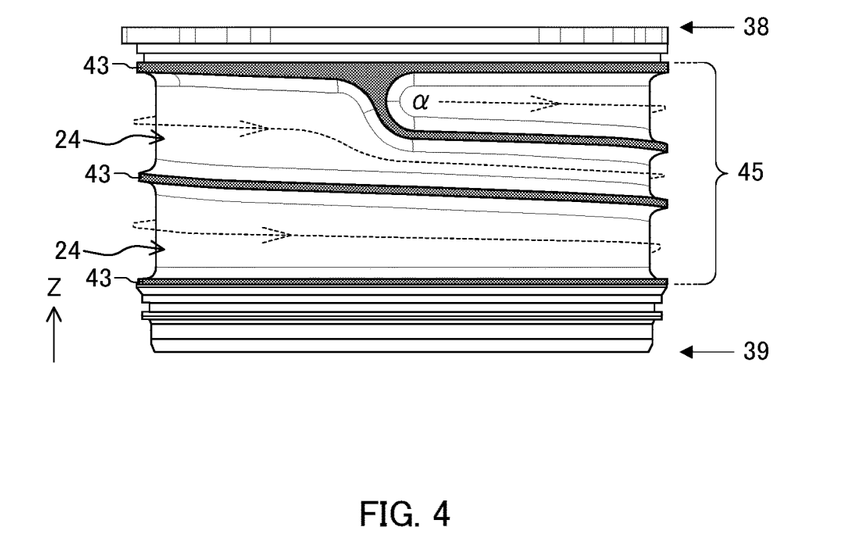
FIG. 4 is a side view of the inner pipe.
Figure 5:
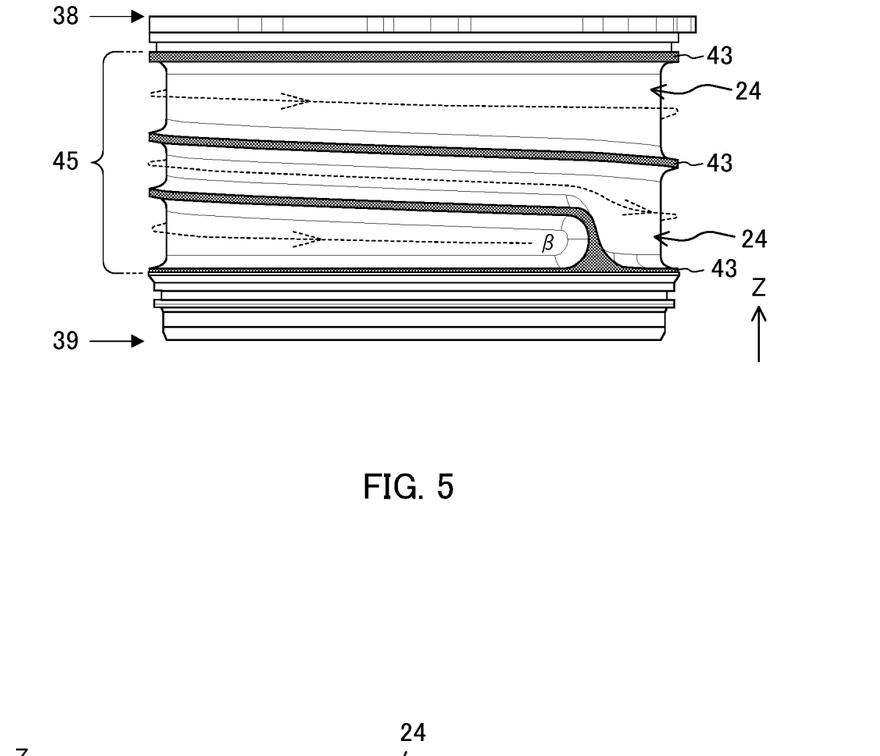
FIG. 5 is a side view of the inner pipe as viewed from another direction.

FIG. 4 is a side view of the inner pipe 31. FIG. 5 is a side view of the inner pipe 31 as viewed from another direction. As shown in FIGS. 4 and 5, the refrigerant flow path 24 is formed so as to spirally circulate along the outer circumferential surface of the inner pipe 31 from the inlet α to the outlet β. The refrigerant flow path 24 is provided in substantially the entire range (hereinafter referred to as a heat generation range 45) in which heat is generated due to the presence of the stator 22 in the Z direction. For this reason, as indicated by dashed arrows, when the refrigerant 13 flows through the refrigerant flow path 24, the entire stator 22 is cooled at least.

Figure 6:
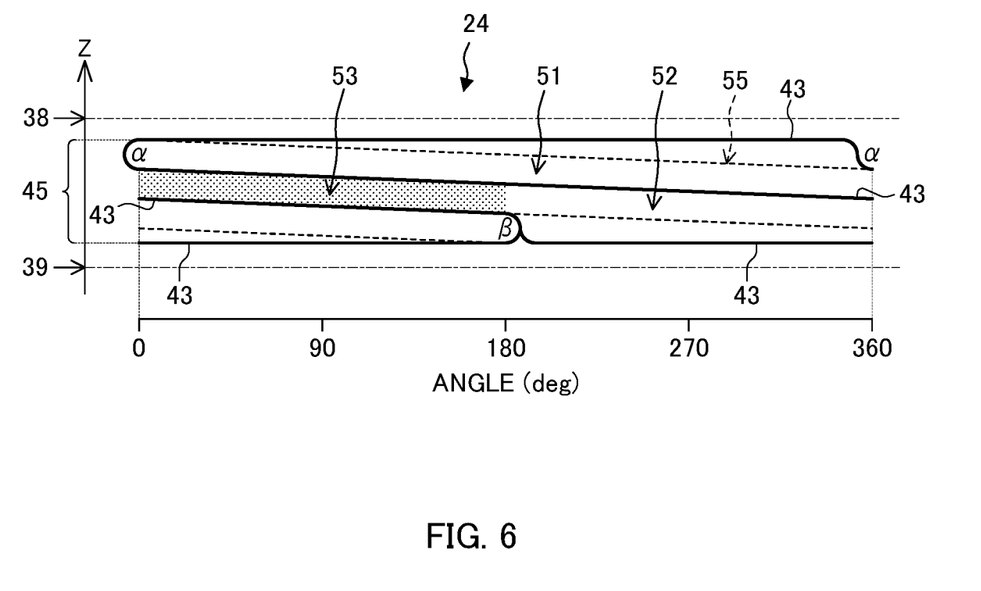
FIG. 6 is an explanatory view showing a detailed configuration of a refrigerant flow path.

FIG. 6 is an explanatory view showing a detailed configuration of the refrigerant flow path 24. As shown in FIG. 6, hereinafter, a position of the refrigerant flow path 24 along the outer circumferential surface is represented by an angle in a plane (XY plane direction) perpendicular to the Z direction with reference to a position of the inlet α. An angle indicating a position in the refrigerant flow path 24 is referred to as an angular position. In the present embodiment, as shown in FIG. 6, angular positions of the inlet α and the outlet β of the refrigerant 13 in the refrigerant flow path 24 are separated from each other, and an angular position of the inlet α is 0 degrees, whereas an angular position of the outlet β is 900 degrees. For this reason, the angular positions of the inlet α and the outlet β are separated by 180 degrees.

Regarding the angular positions of the inlet α and the outlet β, the term "separated" means that the inlet α and the outlet β are located at substantially different angular positions in consideration of sizes of the inlet α and the outlet β, a range in which the refrigerant 13 located at the inlet α and the outlet β cools the stator 22, and the like. A structure of the refrigerant flow path 24 described in detail below is a structure for effectively cooling the accommodated stator 22 and the like even when the inlet α and the outlet β are separated. Therefore, it can be said that the positions of the inlet α and the outlet β are substantially separated from each other as long as a cooling effect of a part or the whole of the stator 22 is enhanced by adopting the structure of the refrigerant flow path 24.

In addition, as the angular positions of the inlet α and the outlet β are separated, the structure of the refrigerant flow path 24 is more effective in relation to the cooling effect. When the inlet α and the outlet β are separated from each other by, for example, 10 degrees or more, a cooling performance improvement effect due to the structure of the refrigerant flow path 24 can be sufficiently expected. For example, when the inlet α and the outlet β are separated by 45 degrees or more, the cooling performance improvement effect due to the structure of the refrigerant flow path 24 tends to become remarkable. When the inlet α and the outlet β are separated by, for example, 90 degrees or more, the cooling performance improvement effect due to the structure of the refrigerant flow path 24 is particularly remarkable. In a case where a structure other than the refrigerant flow path 24 is adopted, the cooling effect is most likely to be reduced when the inlet α and the outlet β are separated by 180 degrees. For this reason, in a case where the inlet α and the outlet β are separated by 180 degrees, when the structure of the refrigerant flow path 24 is adopted, the cooling effect is most improved.

As shown in FIG. 6, the refrigerant flow path 24 includes a first flow path 51 and a second flow path 52. In the present embodiment, the refrigerant flow path 24 includes a third flow path 53 in addition to the first flow path 51 and the second flow path 52.

The first flow path 51 is formed along the one end surface 38 of the inner housing 21 from the inlet α, and is formed such that a width along the circumferential surface increases along a flow direction of the refrigerant 13. In particular, in the present embodiment, the first flow path 51 is provided in a range extending around the circumferential surface of the inner housing 21 from the inlet α.

The expression "formed along the one end surface 38" means that a part or the whole of a first round closest to the one end surface 38 is included as a constituent element in the refrigerant flow path 24 surrounding the circumferential surface of the inner housing 21. In the present embodiment, the first flow path 51 is a portion of the refrigerant flow path 24 corresponding to the first round from the inlet α, that is, a portion having an angular position of 0 degrees to 360 degrees. In particular, in the first flow path 51, the wall portion 42 and the top portion 43 thereof on the one end surface 38 side are formed parallel to the one end surface 38. Therefore, in a narrower sense, the first flow path 51 is formed along the one end surface 38 even when considering a positional relation between the one end surface 38 and the wall portion 42 forming the first flow path 51.

The flow direction of the refrigerant 13 in the refrigerant flow path 24 is a direction along the refrigerant flow path 24 from the inlet α to the outlet β. In the first flow path 51, the flow direction of the refrigerant 13 is a positive direction (direction from 0 degrees to 360 degrees) of a lower angular position with respect to the inlet α.

The "width along the circumferential surface" refers to a length in the Z direction, that is, an interval between the wall portions 42 (particularly, top portions 43) in the Z direction. As shown in FIG. 6, the first flow path 51 is formed such that the width along the circumferential surface gradually increases as the angular position increases from 0 degrees. As indicated by a dashed line in FIG. 6, when the inlet α and the outlet β are coupled by a spiral flow path having a uniform width, the flow path is defined as a reference flow path 55. A width along a circumferential surface of the reference flow path 55 is defined as a reference width. At this time, the first flow path 51 has a shape obtained by expanding the flow path with the reference width, that is, the reference flow path 55 in a direction (positive direction in the Z direction) of the one end surface 38 of the inner housing 21. The reference width that is the width of the reference flow path 55 is determined according to an allowable pressure loss of the refrigerant 13 at the inlet α and the outlet β.

The second flow path 52 is formed along the other end surface 39 of the inner housing 21, and is formed such that the width along the circumferential surface decreases toward the outlet β along the flow direction of the refrigerant 13. In particular, in the present embodiment, the second flow path 52 is provided in a range extending around the circumferential surface of the inner housing 26 from the outlet R.

The expression "formed along the other end surface 39" means that a part or the whole of a last round closest to the other end surface 39 is included as a constituent element in the refrigerant flow path 24 surrounding the circumferential surface of the inner housing 21. In the present embodiment, the second flow path 52 is the last round of the refrigerant flow path 24 reaching the outlet β, that is, a portion having an angular position of 540 degrees to 900 degrees. In particular, in the second flow path 52, the wall portion and the top portion 43 thereof on the other end surface 39 side are formed parallel to the other end surface 39. Therefore, in a narrower sense, the second flow path 52 is formed along the other end surface 39 even when considering a positional relation between the other end surface 39 and the wall portion 42 forming the second flow path 52.

The flowing direction of the refrigerant 13 in the second flow path 52 is a direction along the outlet β from an angular position of 540 degrees. As shown in FIG. 6, the second flow path 52 is formed such that the width along the circumferential surface gradually decreases as the angular position increases from the angular position of 540 degrees to the outlet β. In particular, the second flow path 52 has a shape obtained by expanding the reference flow path 55, which is the flow path with the reference width, in a direction (negative direction in the Z direction) of the other end surface 39 of the inner housing 21.

The third flow path 53 is a flow path of the refrigerant 13 that is provided between the first flow path 51 and the second flow path 52 and couples the first flow path 51 and the second flow path 52. The third flow path 53 is formed to have a uniform width along the circumferential surface. The width of the third flow path 53 is formed to be narrower than a width of a widest portion of the first flow path 51 and narrower than a width of a widest portion of the second flow path 52. In the present embodiment, as indicated by hatching in FIG. 6, the third flow path 53 is a portion at an angular position of 360 degrees to 540 degrees. In particular, in the present embodiment, the width of the third flow path 53 is equal to the reference width which is the width of the reference flow path 55. The structure of the third flow path 53 contributes to suppression of the pressure loss of the refrigerant 13, particularly to minimization of the pressure loss.

A boundary between the first flow path 51 and the third flow path 53 and a boundary between the second flow path 52 and the third flow path 53 are formed by straight lines along a circumferential direction of the inner housing 21. Furthermore, in the present embodiment, the boundary between the first flow path 51 and the second flow path 52 is also formed by a straight line along the circumferential direction of the inner housing 21. The straight line corresponds to the wall portion 42 when the reference flow path 55 is formed. In this way, the boundaries of the first flow path 51, the second flow path 52, and/or the third flow path 53 are formed by the straight lines in order to reduce the pressure loss of the refrigerant 13 and further improve the cooling performance by substantially conforming to the reference flow path 55.

[Action of Refrigerant Flow Path]

Hereinafter, the action of the refrigerant flow path 24 configured as described above will be described in comparison with a refrigerant flow path of a comparative example.

Figure 7:
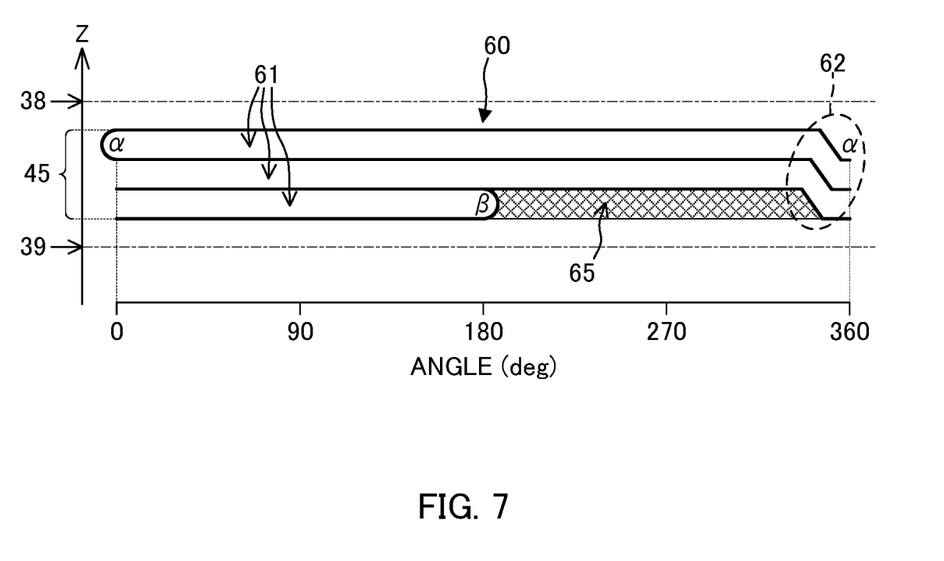
FIG. 7 is an explanatory view showing a configuration of a refrigerant flow path of a comparative example.

FIG. 7 is an explanatory view showing a configuration of the refrigerant flow path 60 of the comparative example. In the comparative example, the configuration of the inner housing 21 other than the refrigerant flow path 60, such as the angular positions of the inlet α and the outlet β of the refrigerant 13, is the same as that of the inner housing 21 of the present embodiment. As shown in FIG. 7, the refrigerant flow path 60 of the comparative example is configured to surround the circumferential surface of the inner housing 21 by a parallel flow path 61 and an inclined flow path 62. The parallel flow path 61 is a flow path of the refrigerant 13 and is parallel to the one end surface 38 and the other end surface 39. A width of the parallel flow path 61 along the circumferential surface is uniform. The inclined flow path 62 is a flow path of the refrigerant 13 provided at a connection portion of the parallel flow path 61, and is formed to be inclined with respect to the parallel flow path 61. A width of the inclined flow path 62 in a direction perpendicular to the flow direction of the refrigerant 13 is the same as that of the parallel flow path 61.

As shown in FIG. 7, in a case where the refrigerant flow path 60 is formed by the parallel flow path 61, a portion where the refrigerant flow path is not formed (hereinafter referred to as a flow path non-forming portion 65) is generated in the heat generation range 45 according to a separation angle between the inlet α and the outlet β. Of course, the refrigerant flow path 60 can also be formed by formally extending the parallel flow path 61 to the flow path non-forming portion 65 prior to the outlet β, but in such a formal flow path, the refrigerant 13 stays, and thus a substantial cooling effect is significantly reduced. For this reason, the extended portion of the formal parallel flow path 61 cannot be said to be a substantial refrigerant flow path.

Figure 8:
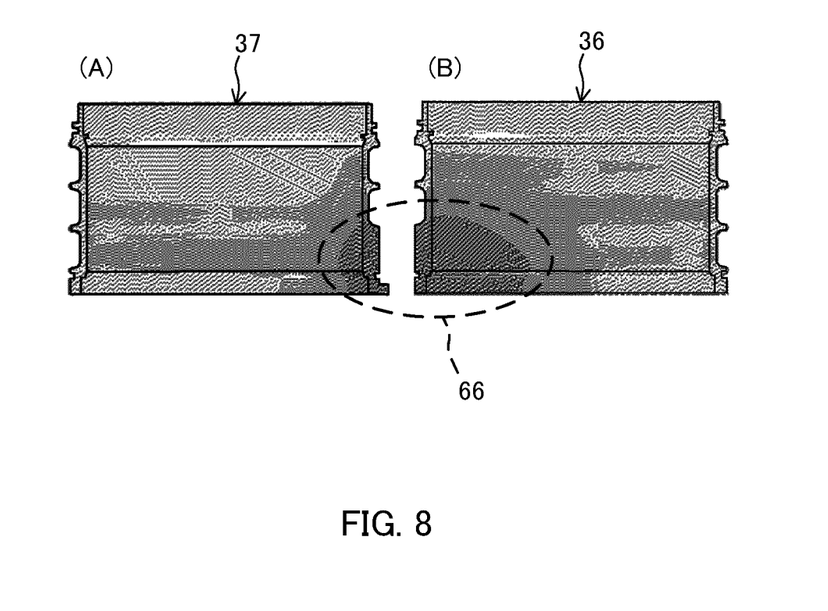
FIG. 8 is an explanatory view showing an inner surface temperature of an inner housing employing the refrigerant flow path of the comparative example.

FIG. 8 is an explanatory view showing an inner surface temperature of the inner housing 21 employing the refrigerant flow path 60 of the comparative example. (A) of FIG. 8 shows a temperature distribution of the left inner circumferential surface 37 when the refrigerant flow path 60 of the comparative example is adopted. (B) of FIG. 8 shows a temperature distribution of the right inner circumferential surface 36 when the refrigerant flow path 60 of the comparative example is adopted. In FIG. 8, a portion having a higher density (black) indicates a higher temperature.

As shown in FIG. 8, when the refrigerant flow path 60 of the comparative example is adopted, a significant high-temperature portion 66 exceeding an allowable limit is generated on the right inner circumferential surface 36 and the left inner circumferential surface 37. The high-temperature portion 66 corresponds to the flow path non-forming portion 65. That is, in the refrigerant flow path 60 of the comparative example, the flow path non-forming portion 65 is inevitably formed, and as a result, the high-temperature portion 66 is generated. For this reason, in the refrigerant flow path 60 of the comparative example, there is a failure that the first motor 20 is not sufficiently cooled.

Figure 9:
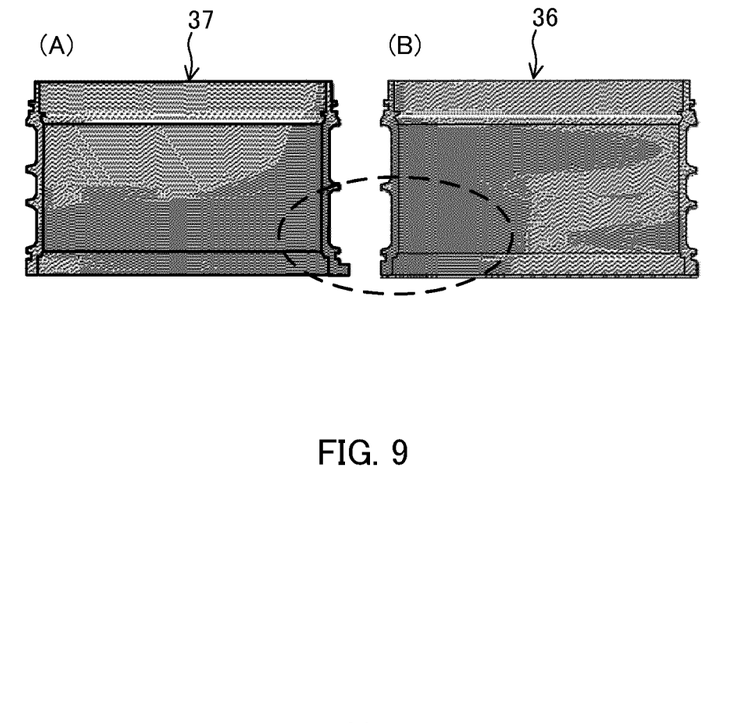
FIG. 9 is an explanatory view showing an inner surface temperature of an inner housing employing a refrigerant flow path according to the present embodiment.

FIG. 9 is an explanatory view showing an inner surface temperature of the inner housing 21 employing the refrigerant flow path 24 according to the present embodiment. (A) of FIG. 9 shows a temperature distribution of the left inner circumferential surface 37 when the refrigerant flow path 24 of the present embodiment is adopted. (B) of FIG. 9 shows a temperature distribution of the right inner circumferential surface 36 when the refrigerant flow path 24 of the present embodiment is adopted. In FIG. 9, a portion having a higher density (black) indicates a higher temperature.

As indicated by a dashed line in FIG. 9, the significant high-temperature portion 66 is generated in the refrigerant flow path 60 of the comparative example, whereas the high-temperature portion 66 is not generated when the refrigerant flow path 24 according to the present embodiment is adopted. Therefore, the refrigerant flow path 24 according to the present embodiment can sufficiently cool the first motor 20.

As described above, the reason why the refrigerant flow path 24 according to the present embodiment can sufficiently cool the first motor 20 without generating the high-temperature portion 66 is that the refrigerant flow path 24 includes at least the first flow path 51 and the second flow path 52.

Specifically, the first flow path 51 has a structure in which the width thereof gradually increases from the inlet α. For this reason, since the refrigerant flow path 24 includes the first flow path 51, the refrigerant flow path 24 has a structure in which the flow path non-forming portion 65 is not formed at the end at least on the one end surface 38 side in the heat generation range 45. The second flow path 52 has a structure in which the width thereof gradually decreases toward the outlet β. For this reason, since the refrigerant flow path 24 includes the second flow path 52, the refrigerant flow path 24 has a structure in which the flow path non-forming portion 65 is not formed at the end at least on the other end surface 39 side in the heat generation range 45.

Therefore, since the refrigerant flow path 24 includes the first flow path 51 and the second flow path 52, the refrigerant flow path 24 has a structure in which the flow path non-forming portion 65 is not formed and almost the entire heat generation range 45 is cooled by the refrigerant 13. As a result, compared to the refrigerant flow path 60 of the comparative example in which the flow path non-forming portion 65 is generated due to the separation between the inlet α and the outlet β, the refrigerant flow path 24 according to the present embodiment can cool almost the entire heat generation range 45 by the refrigerant 13 flowing therethrough. For this reason, the refrigerant flow path 24 according to the present embodiment can sufficiently cool the first motor 20.

Figure 10:
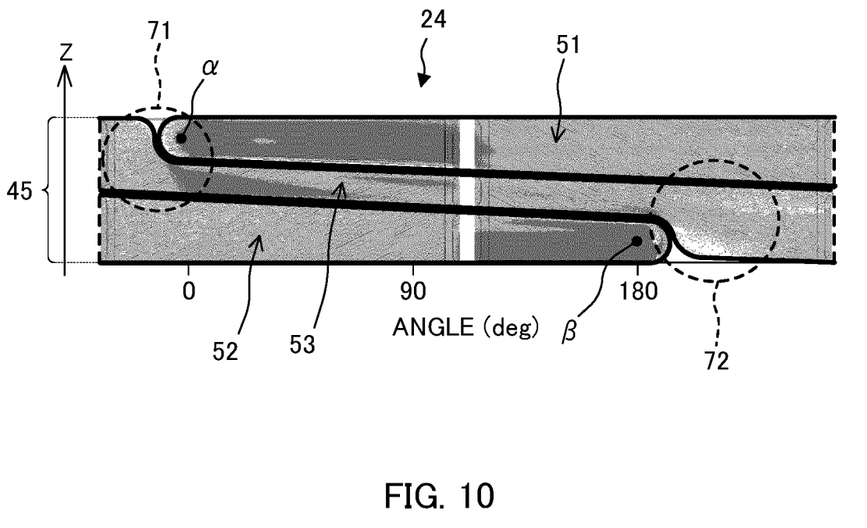
FIG. 10 is an explanatory view showing a flow velocity of a refrigerant in the refrigerant flow path according to the present embodiment.

FIG. 10 is an explanatory view showing a flow velocity of the refrigerant 13 in the refrigerant flow path 24 according to the present embodiment. In FIG. 10, a portion having a higher density (black) indicates a higher flow velocity, and a portion having a lower density (white) indicates a lower flow velocity. However, a white band at an angular position of more than 90 degrees is merely a missing part of data due to simulation settings, and does not indicate that the flow velocity of the refrigerant 13 is low.

As shown in FIG. 10, in the refrigerant flow path 24, due to a relation between structures to be satisfied by the first flow path 51 and the third flow path 53, the connection portion therebetween becomes a steep contraction portion 71 in which the width along the circumferential direction is suddenly contracted. In the refrigerant flow path 24, due to the relation between the structures to be satisfied by the third flow path 53 and the second flow path 52, the connection portion therebetween becomes a steep expansion portion 72 in which the width along the circumferential direction is suddenly expanded.

In general, when a flow path of a fluid is rapidly contracted or rapidly expanded, a velocity (flow velocity) of the fluid is locally and remarkably decreased in the portion, and a large pressure loss occurs. However, in the refrigerant flow path 24, the structures of the first flow path 51 and the second flow path 52 prevent a local and remarkable velocity decrease in the vicinity of the steep contraction portion 71 and the steep expansion portion 72. As a result, in the refrigerant flow path 24, the pressure loss in the steep contraction portion 71 and the steep expansion portion 72 is suppressed, and sufficient cooling performance is realized including the steep contraction portion 71 and the steep expansion portion 72.

Specifically, since the first flow path 51 is formed such that the width thereof gradually increases, the refrigerant 13 flows through the first flow path 51 from the inlet α, and thus the velocity thereof gradually decreases over a long distance. For this reason, also in the first flow path 51 whose width is increased with respect to the reference flow path 55, the refrigerant 13 diffuses to almost every corner. For example, as shown in FIG. 10, in the steep contraction portion 71 which is the end of the first flow path 51, the refrigerant 13 is easily diffused to corners. As a result, a portion on the one end surface 38 side in the heat generation rang 45 is sufficiently cooled by the structure of the first flow path 51.

In the first flow path 51, the velocity of the refrigerant 13 decreases, but a change in velocity is gentle, and a locally large decrease in flow velocity does not occur. For this reason, an energy loss proportional to the square of the velocity of the refrigerant 13 can be suppressed. As a result, a change in pressure of the refrigerant 13 in the first flow path 51 becomes gentle, and no significant pressure loss occurs in the first flow path 51.

Thereafter, the velocity of the refrigerant 13 is reduced by passing through the first flow path 51, and the refrigerant 13 reaches the steep contraction portion 71 in a state of high diffusibility. Accordingly, the refrigerant 13 can flow into the third flow path 53 without large energy loss at the steep contraction portion 71. That is, the refrigerant flow path 24 reduces the pressure loss at the steep contraction portion 71 by the structure of the first flow path 51.

Similar to the first flow path 51, since the second flow path 52 is formed such that the width thereof gradually decreases, the refrigerant 13 flows through the second flow path 2 toward the outlet β, and thus the velocity thereof gradually increases over a long distance. For this reason, also in the second flow path 52 whose width is increased with respect to the reference flow path 55, the refrigerant 13 diffuses to almost every corner. For example, as shown in FIG. 10, in the steep expansion portion 72 which is the beginning of the second flow path 52, the refrigerant 13 is easily diffused to corners. As a result, a portion on the other end surface 39 side in the heat generation rang 45 is sufficiently cooled by the structure of the second flow path 52. In particular, since the refrigerant flow path 24 is formed in a spiral shape, the flow direction of the refrigerant 13 in the steep expansion portion 72 is inclined toward the other end surface 39. For this reason, the refrigerant 13 flowing in from the third flow path 53 flows in a direction of the wall portion 42 parallel to the other end surface 39. As a result, the refrigerant 13 easily diffuses to the corners of the steep expansion portion 72. In this way, since the refrigerant 13 is easily diffused also in the steep expansion portion 72, a local velocity decrease and a pressure loss in the steep expansion portion 72 or in the vicinity thereof are suppressed.

In the second flow path 52, the velocity of the refrigerant 13 changes (increases), but the change in velocity is gentle, and a locally large change in flow velocity does not occur. For this reason, an energy loss proportional to the square of the velocity of the refrigerant 13 can be suppressed. As a result, a change in pressure of the refrigerant 13 in the second flow path 52 becomes gentle, and no significant pressure loss occurs in the second flow path 52.

As described above, the refrigerant flow path 24 is configured to suppress the pressure loss of the refrigerant 13 by the first flow path 51 and the second flow path 52, and the effect of suppressing the pressure loss is remarkable to the extent that the pressure loss is suppressed better than the refrigerant flow path 60 of the comparative example. That is, in comparison with the pressure loss of the refrigerant 13, the pressure loss of the refrigerant 13 at the outlet β of the refrigerant flow path 24 according to the present embodiment is smaller than the pressure loss of the refrigerant 13 at the outlet β of the refrigerant flow path 60 of the comparative example.

Figure 11:
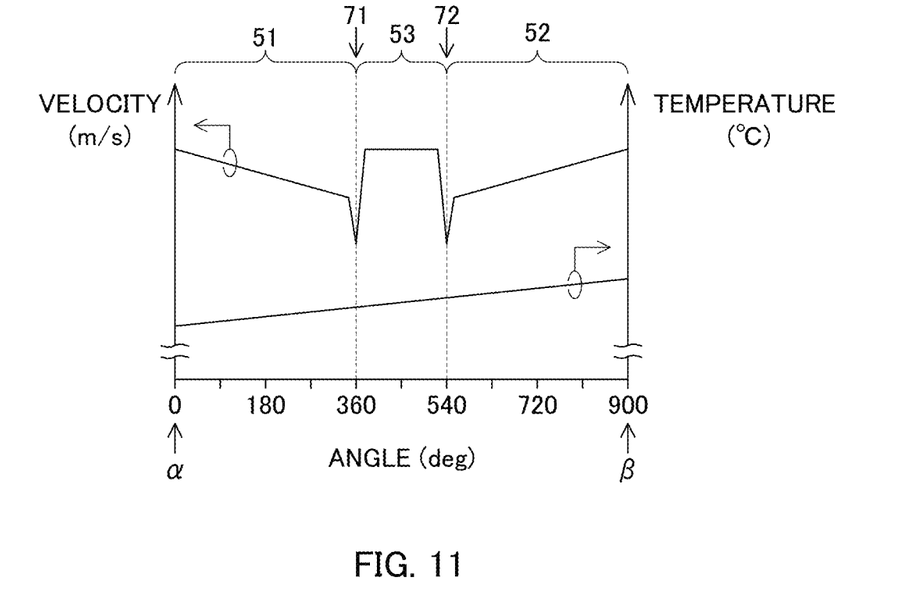
FIG. 11 is a graph schematically showing changes in flow velocity and temperature of the refrigerant.

FIG. 11 is a graph schematically showing changes in flow velocity and temperature of the refrigerant 13. As shown in FIG. 11, in the refrigerant flow path 24, the velocity of the refrigerant 13 is low and the temperature thereof is high in the vicinity of the steep expansion portion 72. For this reason, the steep expansion portion 72 and the vicinity thereof are the most severe environment for the cooling performance of the first motor 20, and are likely to reach a high temperature. However, as shown in FIG. 9, the temperature does not become extremely high even in the portion corresponding to the steep expansion portion 72, and the right inner circumferential surface 36 and left inner circumferential surface 37 that abut against the stator 22 as a whole are sufficiently cooled by the refrigerant flow path 24.

[Coupling Structure of First Motor and Second Motor]

Figure 12:
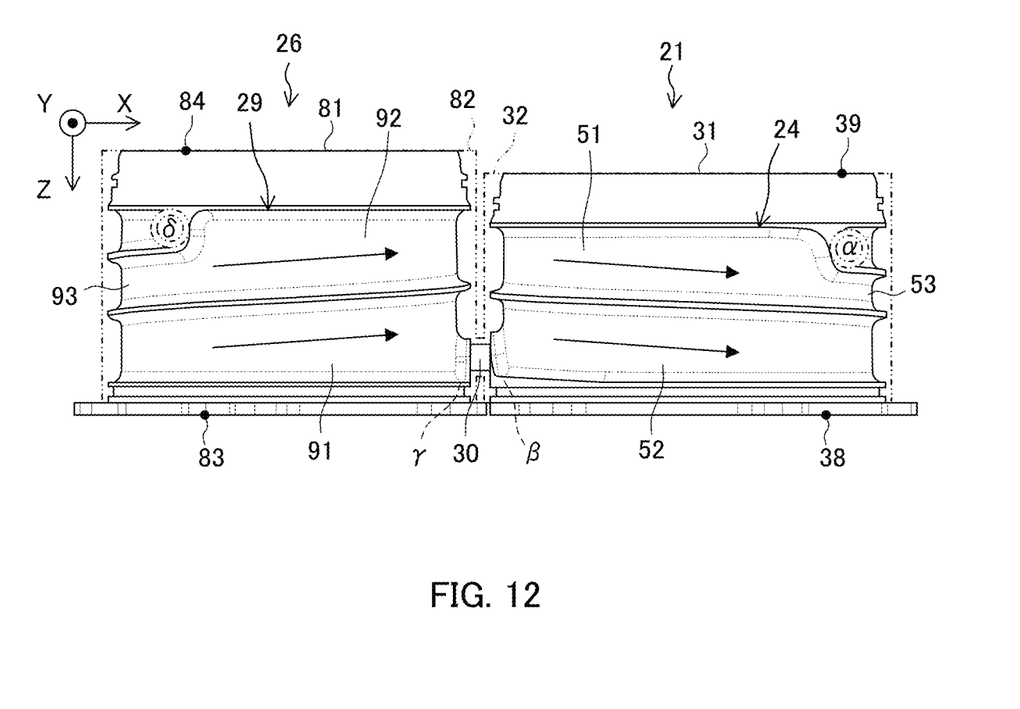
FIG. 12 is an explanatory view showing a configuration of a refrigerant flow path of an entire rotating electrical machine.

FIG. 12 is an explanatory view showing a configuration of a refrigerant flow path of the entire rotating electrical machine 11. As shown in FIG. 12, the refrigerant flow path 24 of the first motor 20 extends from the inlet α in the positive direction of the Z direction in a right-handed spiral and reaches the outlet β. On the other hand, the refrigerant flow path 29 of the second motor 25 extends from the inlet γ in the negative direction of the Z direction in a left-handed spiral and reaches the outlet δ. That is, the refrigerant flow path 24 of the first motor 20 and the refrigerant flow path 29 of the second motor 25 are different in helicity (or chirality), and are spirally wound in opposite directions. As described above, in a case where the refrigerant flow path 24 of the first motor 20 and the refrigerant flow path 29 of the second motor 25 are formed in a spiral shape in which the two refrigerant flow paths 24 and 29 are wound in opposite directions to each other, the refrigerant flow path 24 of the first motor 20 and the refrigerant flow path 29 of the second motor 25 can be linearly connected to each other in a shortest length by the coupling pipe 30 without providing a needlessly long connecting pipe. For this reason, the first motor 20 and the second motor 25 are disposed in a space-saving manner, and a compact rotating electrical machine 11 is provided. In addition, in a case where the refrigerant flow path 24 of the first motor 20 and the refrigerant flow path 29 of the second motor 25 are formed in a spiral shape in which the two refrigerant flow paths 24 and 29 are wound in opposite directions to each other, it is possible to easily align respective attachment surfaces of the first motor 20 and the second motor 25 with respect to the outer housing 10, and it is easy to arrange the first motor 20 and the second motor 25 in a space-saving manner compared to a case where the respective attachment surfaces are not aligned.

The refrigerant flow path 29 of the second motor 25 is formed in a spiral shape that is wound in a reverse direction with respect to the refrigerant flow path 24 of the first motor 20 as described above, but the basic structure thereof is the same as that of the refrigerant flow path 24 of the first motor 20. The inner housing 26 of the second motor 25 is formed by an inner pipe 81 and an outer pipe 82, similar to the inner housing 21 of the first motor 20. The refrigerant flow path 29 of the second motor 25 is formed on an outer circumferential surface of the inner pipe 81. In the inner pipe 81, an end surface on the positive side in the Z direction where a flange portion is provided is one end surface 83, and an end surface on the negative side in the Z direction is the other end surface 84.

The refrigerant flow path 29 of the second motor 25 includes a first flow path 91 and a second flow path 92. In the present embodiment, the refrigerant flow path 29 of the second motor 25 further includes a third flow path 93. The first flow path 91 is formed along the one end surface 83 of the inner housing 26, and is formed such that a width along the circumferential surface increases along the flow direction of the refrigerant 13. The second flow path 92 is formed along the other end surface 84 of the inner housing 26 from the inlet γ, and is formed such that a width along the circumferential surface decreases toward the outlet δ along the flow direction of the refrigerant 13. The third flow path 93 is formed between the first flow path 91 and the second flow path 92 so that the width along the circumferential surface is uniform, and couples the first flow path 91 and the second flow path 92. That is, the refrigerant flow path 29 of the second motor 25 is formed in the same manner as the refrigerant flow path 24 of the first motor 20 except that the refrigerant flow path 29 is wound in a reverse direction.

In a case where the drive unit 100 is provided with a rotating electrical machine in which a plurality of motors are arranged in a compact manner as in the rotating electrical machine 11, the refrigerant flow path 14 of the outer housing 10 is preferably formed as shown in FIG. 1, for example. That is, in order to form the drive unit 100 in a compact manner, it is preferable that the refrigerant flow paths 14 of the outer housing 10 couples the respective portions constituting the drive unit 100 by substantially the shortest route. However, when the refrigerant flow path 14 of the outer housing 10 is formed in this manner, the inlet and the outlet of the refrigerant to each of motors constituting the rotating electrical machine are separated from each other. When the drive unit 100 is configured to be particularly compact, the inlet and the outlet of the refrigerant flow path in each of the motors constituting the rotating electrical machine are separated by about 180 degrees. This is as shown in FIG. 1 and the like by the inlet α and the outlet β of the refrigerant flow path 24 of the first motor 20 and the inlet γ and the outlet δ of the refrigerant flow path 29 of the second motor 25.

On the other hand, considering only the cooling performance of the first motor 20, it is desirable that the inlet α and the outlet β of the refrigerant flow path 24 of the first motor 20 are not separated from each other so that the flow path non-forming portion 65 is substantially not formed. The same applies to the second motor 25. That is, considering only the cooling performance for each of the motors constituting the rotating electrical machine, it is desirable that the inlet and the outlet of the refrigerant flow path are not substantially separated. However, in consideration of the cooling performance of the first motor 20 and/or the second motor 25 alone, the redundancy of the refrigerant flow path 14 of the outer housing 10 results in a disadvantage that the drive unit 100 cannot be configured compactly.

Therefore, according to the present embodiment, the structures of the refrigerant flow path 24 and the refrigerant flow path 29, and the coupling structures thereof are the best structures that enable the drive unit 100 to be formed as compact as possible with respect to the flow path of the refrigerant 13, and further maximize the cooling performance of the first motor 20 and the second motor 25.

[First Modification]

In the above embodiment, in addition to the first flow path 51 and the second flow path 52, the refrigerant flow path 24 of the first motor 20 includes the third flow path 53 coupling the first flow path 51 and the second flow path 52. Further, in addition to the first flow path 91 and the second flow path 92, the refrigerant flow path 29 of the second motor 25 also includes a third flow path 93 coupling the first flow path 91 and the second flow path 92. However, the third flow paths 53 and 93 may be omitted in consideration of cooling performance, pressure loss, and the like. Also in this case, the same effects as those of the refrigerant flow path 24 and the like according to the above embodiment can be obtained.

Figure 13:
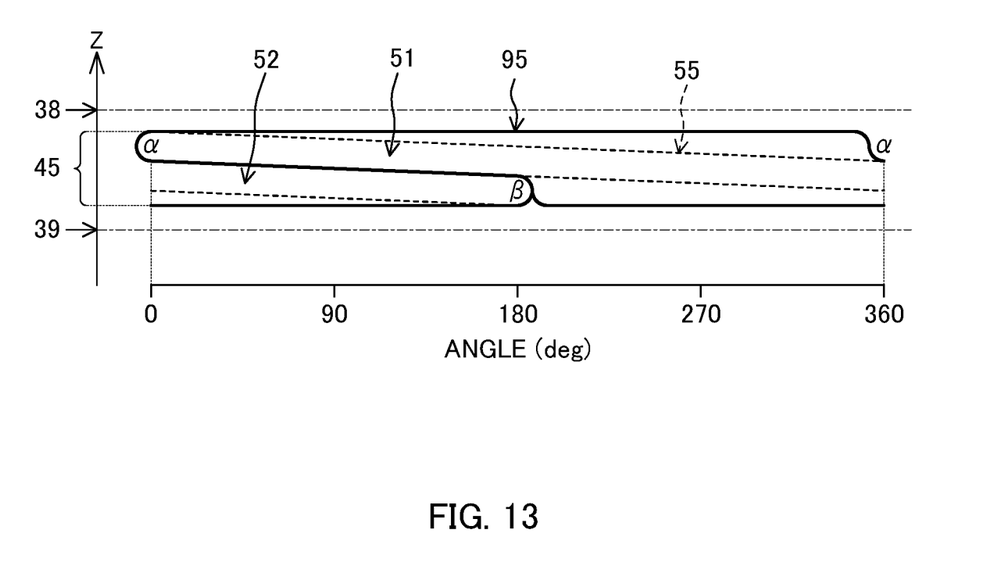
FIG. 13 is an explanatory view showing a configuration of a refrigerant flow path according to a first modification.

FIG. 13 is an explanatory view showing a configuration of a refrigerant flow path 95 according to a first modification. The refrigerant flow path 95 of the modification is a refrigerant flow path in which the third flow path 53 in the refrigerant flow path 24 of the first motor 20 is omitted and the first flow path 51 and the second flow path 52 are directly coupled. In the refrigerant flow path 85 of the modification, a range of an angular position of 0 degrees (inlet α) to 360 degrees or 180 degrees is a range formed along the one end surface 38 and formed such that the width along the circumferential surface increases along the flow direction of the refrigerant 13. Therefore, in the refrigerant flow path 85 of the modification, the range of 0 degrees to 360 degrees or 180 degrees is the first flow path 51.

Similarly, in the refrigerant flow path 85 of the modification, a range of an angular position of 180 degrees or 360 degrees to 540 degrees (outlet β) is a range formed along the other end surface 39 and formed such that the width along the circumferential surface decreases toward the outlet β along the flow direction of the refrigerant 13. Therefore, in the refrigerant flow path the range of 180 degrees or 360 degrees to 540 degrees (outlet β) is the second flow path 52.

The range of the angular position of 180 degrees to 360 degrees satisfies a condition for the first flow path 51 by being grasped integrally with the first flow path 51, and satisfies a condition for the second flow path 52 by being grasped integrally with the second flow path 52, as described above. For this reason, the range of the angular position of 180 degrees to 360 degrees can belong to both the first flow path 51 and the second flow path 52. In addition, since the width along the circumferential direction is larger than that of the reference flow path 55, it is different from the third flow paths 53 and 93. Therefore, the range of the angular position of 180 degrees to 360 degrees belongs to one or both of the first flow path 51 and the second flow path 52.

[Second Modification]

In the above embodiment, the refrigerant flow path 24 of the first motor 20 includes the third flow path 53, and the refrigerant flow path 29 of the second motor 25 includes the third flow path 93. The third flow paths 53 and 93 are provided over half the circumference of the inner housings 21 and 26. However, the number of turns of the third flow paths 53 and 93 can be freely changed by adaptation in accordance with an allowable pressure loss (hereinafter referred to as an allowable pressure loss), dimensions of the inlets α and γ and the outlets 13 and 6, and the like.

Figure 14:
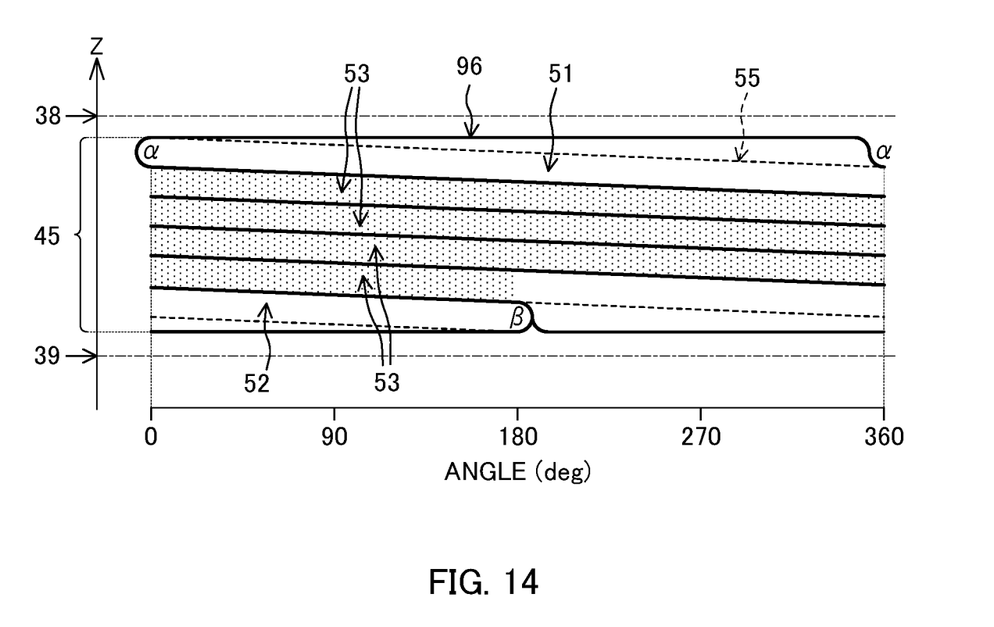
FIG. 14 is an explanatory diagram showing a configuration of a refrigerant flow path according to a second modification.

FIG. 14 is an explanatory diagram showing a configuration of a refrigerant flow path 96 according to a second modification. As shown in FIG. 14, for example, when the allowable pressure loss is large and a relatively large pressure loss is allowable, the number of turns of the third flow paths 53 and 93 can be increased. Conversely, when the allowable pressure loss is small and only a relatively small pressure loss is allowable, the number of turns of the third flow paths 53 and 93 can be reduced (see FIG. 13).

Note that changing the number of turns of the third flow paths 53 and 93 is synonymous with changing the number of turns of the refrigerant flow paths 24 and 29. The number of turns of the third flow paths 53 and 93 correlates with the width of the third flow paths 53 and 93 and a spiral angle (pitch) formed by the third flow paths 53 and 93 and the refrigerant flow paths 24 and 29, and by determining one of these, the other parameters are automatically determined. Therefore, as in the second modification, instead of changing the number of turns of the third flow paths 53 and 93, the width of the third flow paths 53 and 93 or the spiral angle formed by the third flow paths 53 and 93 and the refrigerant flow paths 24 and 29 may be changed. The allowable pressure loss is appropriately determined according to, for example, the dimensions of the stators 22 and 27.

As described above, a rotating electrical machine 11 according to the present embodiment and the modifications includes an inner housing 21 (26) that is a cylindrical housing. The inner housing 21 (26) that is a cylindrical housing includes a refrigerant flow path 24 (29) configured to allow a refrigerant 13 to flow therethrough, an inlet α (γ) configured to allow the refrigerant 13 to flow into the refrigerant flow path 24 (29), and an outlet β (δ) configured to allow the refrigerant 13 to flow out of the refrigerant flow path 24 (29). The refrigerant flow path 24 is formed so as to spirally surround around a circumferential surface of the inner housing 21 (26). In addition, the refrigerant flow path 24 (29) includes a first flow path 51 (91) that is formed along one end surface 38 (83) of the inner housing 21 (26) and formed such that a width along the circumferential surface increases along a flow direction of the refrigerant 13 from the inlet α (γ), and a second flow path 52 (92) that is formed along the other end surface 39 (84) of the inner housing 21 (26) and formed such that a width along the circumferential surface decreases toward the outlet β (δ) along the flow direction of the refrigerant 13.

As described above, in a case where the refrigerant flow path 24 (29) is provided in the inner housing 21 (26) of the rotating electrical machine 11 and the refrigerant flow path 24 (29) includes the first flow path 51 (91) and the second flow path 52 (92), a flow path non-forming portion 65 is substantially not formed even when the inlet α (γ) and the outlet β (δ) of the refrigerant 13 are separated from each other. The first flow path 51 (91) and the second flow path 52 (92) suppress a local decrease in velocity of the refrigerant 13 and an increase in pressure loss, and obtain sufficient cooling performance almost entirely. Thus, in the refrigerant flow path 24 (29), the first flow path 51 (91) and the second flow path 52 (92) allow substantially the entire heat generation range 45 to be cooled by the refrigerant 13 flowing through the refrigerant flow path 24 (29). Therefore, in the rotating electrical machine 11 in which the refrigerant flow path 24 (29) including the first flow path 51 (91) and the second flow path 52 (92) is formed, cooling performance is improved and necessary cooling performance is obtained.

In the rotating electrical machine 11 according to the above embodiment and the modifications, the inlet α (γ) and the outlet β (δ) of the refrigerant 13 are provided at positions at which the inlet α (γ) and the outlet β (δ) of the refrigerant 13 are separated from each other in a circumferential direction of the inner housing 21 (26). For this reason, an effect of improving the cooling performance is particularly remarkable.

In the rotating electrical machine 11 according to the embodiment and the modifications, the refrigerant flow path 24 (29) includes a third flow path 53 (93) having a uniform width between the first flow path 51 (91) and the second flow path 52 (92). Since the width of the third flow path 53 (93) is uniform, the velocity reduction and the pressure loss of the refrigerant 13 flowing through the refrigerant flow path 24 (29) are reduced. Therefore, since the refrigerant flow path 24 (29) includes the third flow path 53 (93), the required sufficient cooling effect can be easily obtained while satisfying an allowable pressure loss condition.

In the rotating electrical machine 11 according to the embodiment and the modifications, the width of the third flow path 53 (93) is narrower than a width of a widest portion of the first flow path 51 (91) and narrower than a width of a widest portion of the second flow path 52 (92). This structure is particularly likely to suppress pressure loss. As a result, the required sufficient cooling effect can be particularly easily obtained while satisfying the allowable pressure loss condition.

In the rotating electrical machine 11 according to the embodiment and the modification, when a flow path connecting the inlet α (γ) and the outlet β (δ) with a uniform width determined according to an allowable pressure loss of the refrigerant 13 is defined as a reference flow path 55, the first flow path 51 (91) has a shape obtained by expanding the reference flow path 55 in a direction of the one end surface 38 (83) of the inner housing 21 (26). The second flow path 52 (92) has a shape obtained by expanding the reference flow path 55 in a direction of the other end surface 39 (84) of the inner housing 21 (26). When the reference flow path 55 is formed and the reference flow path surrounds the inner housing 21 (26), the flow path non-forming portion 65 is inevitably formed. In contrast, as described above, the first flow path 51 (91) and the second flow path 52 (92) each have a shape obtained by expanding the reference flow path 55 in the directions of the one end surface 38 (83) and the other end surface 38 (84), respectively. For this reason, in the refrigerant flow path 24 (29), a portion of the flow path non-forming portion 65 generated when the reference flow path 55 is formed becomes the first flow path 51 (91) and the second flow path 52 (92). As a result, the rotating electrical machine 11 is more reliably cooled.

In the rotating electrical machine 11 according to the embodiment and the modifications, a boundary between the first flow path 51 (91) and the third flow path 53 (93) and a boundary between the second flow path 52 (92) and the third flow path 53 (93) are formed by straight lines along a circumferential direction of the inner housing 21 (26). Accordingly, the third flow path 53 (93) is a flow path generally conforming to the reference flow path As a result, the pressure loss of the refrigerant 13 in the third flow path 53 (93) is reduced, and the cooling performance is further enhanced.

In the rotating electrical machine 11 according to the embodiment and the modifications, the first flow path 51 (91) is provided in a range extending around the circumferential surface of the inner housing 21 (26) from the inlet α (γ). The second flow path 52 (92) is provided in a range extending around the circumferential surface of the inner housing 21 (26) from the outlet β (δ). A range of one round from the inlet α (γ) and a range of one round from the outlet β (δ) are particularly prone to the generation of the flow path non-forming portion 65. Therefore, when the first flow path 51 (91) is provided in the range of at least one round from the inlet α (γ) and the second flow path 52 (92) is provided in the range of at least one round from the outlet β (δ), the cooling performance of the rotating electrical machine 11 is easily improved.

However, the first flow path 51 (91) may be provided beyond the range of one round from the inlet α (γ), and the second flow path 52 (92) may be provided within the range of one round from the outlet β (δ). When there are other circumstances, such as when the third flow path 53 (93) is not provided as shown in FIG. 13, the first flow path 51 (91) and/or the second flow path 52 (92) may not be provided in the entire range of one round.

In the rotating electrical machine 11 according to the embodiment and the modifications, the inner housing 21 (26) includes the inner housing 21 that is a first housing, the inner housing 26 that is a second housing, and a coupling pipe 30. The inner housing 21 that is the first housing accommodates a stator 22 as a first stator and a rotor 23 as a first rotor, and has the refrigerant flow path 24. The inner housing 26 that is the second housing accommodates a stator 27 as a second stator and a rotor 28 as a second rotor, and has the refrigerant flow path 29. The coupling pipe 30 linearly couples the outlet β of the inner housing 21 that is the first housing and the inlet γ of the inner housing 26 that is the second housing without waste. For this reason, the rotating electrical machine 11 incorporating two motors is configured to be compact while maintaining the cooling performance thereof. Further, the cost of the rotating electrical machine 11 is additionally reduced.

In the rotating electrical machine 11 according to the embodiment and the modifications, the refrigerant flow path 29 of the inner housing 26 that is the second housing is formed in a spiral shape that is wound in a reverse direction with respect to the refrigerant flow path 24 of the inner housing 21 that is the first housing. In this way, when the two refrigerant flow paths 24 and 29 to be coupled are formed in a spiral shape in which the two refrigerant flow paths 24 and 29 are wound in opposite directions to each other, the rotating electrical machine 11 incorporating two motors is easily configured to be particularly compact while maintaining the cooling performance thereof.

Although the embodiment of the present invention has been described above, configurations described in the embodiment and the modification are only a part of application examples of the present invention, and are not intended to limit the technical scope of the present invention.

For example, the first motor 20 may be a power generation motor, and the second motor 25 may be a driving motor. Further, both the first motor 20 and the second motor 25 may be driving motors, and both the first motor 20 and the second motor 25 may be power generation motors. The rotating electrical machine 11 may include only one of the first motor 20 and the second motor 25.

In the above embodiment, the refrigerant flow path 24 is formed by the grooves 41 provided in the outer circumferential surface of the inner pipe 31. Alternatively, the refrigerant flow path 24 can be formed by providing similar grooves in the inner circumferential surface of the outer pipe 32. The refrigerant flow path 24 may be formed by providing grooves in both the outer circumferential surface of the inner pipe 31 and the inner circumferential surface of the outer pipe 32. The same applies to the refrigerant flow path 29.

In the embodiment and the modifications, in the refrigerant flow path 24, the width of the first flow path 51 smoothly increases, and the width of the second flow path 52 smoothly decreases. However, the widths of the first flow path 51 and the second flow path 52 may be changed stepwise, for example. Also in the case where the widths of the first flow path 51 and the second flow path 52 change stepwise, it is possible to obtain the same effects as those of the above embodiment and the like. However, it is preferable that the widths of the first flow path 51 and the second flow path 52 change as smoothly as possible as in the above embodiment and the like. The same applies to the refrigerant flow path 29.

The invention claimed is:

1. A rotating electrical machine comprising:
   a cylindrical first housing having a first flow path configured to allow a refrigerant to flow therethrough in one direction, a first inlet configured to allow the refrigerant to flow into the first flow path, and a first outlet configured to allow the refrigerant to flow out of the first flow path, the first flow path extending in a spiral at a circumferential surface of the first housing;
   a cylindrical second housing having a second flow path configured to allow the refrigerant to flow therethrough in one direction, a second inlet configured to allow the refrigerant to flow into the second flow path, and a second outlet configured to allow the refrigerant to flow out of the second flow path, the second flow path extending in a spiral at a circumferential surface of the second housing, the second flow path formed in a spiral shape that is wound in a reverse direction with respect to the first flow path; and
   a coupling pipe that couples the first outlet and the second inlet and extends linearly from the first outlet to the second inlet, wherein:
   a first portion of the first flow path is formed along one end surface of the first housing such that a width along the circumferential surface increases along a flow direction of the refrigerant from the first inlet;
   a second portion of the first flow path is formed along an other end surface of the first housing such that a width along the circumferential surface decreases toward the first outlet along the flow direction of the refrigerant;
   a third portion of the first flow path connects the first portion and the second portion and has a uniform width;
   a width of the third portion is narrower than a width of a widest portion of the first portion and narrower than a width of a widest portion of the second portion; and
   the first inlet and the first outlet are separated from each other by 90 degrees or more in a circumferential direction of the first housing.

2. The rotating electrical machine according to claim 1, wherein:
   when a flow path having a uniform width that causes a predetermined pressure loss in the refrigerant from the first inlet to the first outlet is defined as a reference flow path, the width of the third portion is equal to a reference width that is a width of the reference flow path.

3. The rotating electrical machine according to claim 2, wherein:
   the first portion has a shape obtained by expanding the reference flow path in a direction of the one end surface of the first housing, and
   the second portion has a shape obtained by expanding the reference flow path in a direction of the other end surface of the first housing.

4. The rotating electrical machine according to claim 1, wherein:

a boundary between the first portion and the third portion and a boundary between the second portion and the third portion are formed by straight lines along the circumferential direction of the first housing.

5. The rotating electrical machine according to claim 1, wherein:
the first portion is provided in a range extending around the circumferential surface of the first housing from the first inlet, and
the second portion is provided in a range extending around the circumferential surface of the first housing from the first outlet.

6. The rotating electrical machine according to claim 1, wherein:
the width of the first portion along the circumferential surface gradually increases along the flow direction of the refrigerant from the first inlet; and
the width of the second portion along the circumferential surface gradually decreases toward the first outlet along the flow direction of the refrigerant.

7. The rotating electrical machine according to claim 1, wherein:
the first flow path is defined at least partially by a wall portion extending from an inner pipe of the first housing to an outer pipe of the first housing, the wall portion disposed between (i) a first end of the first portion and a second end of the first portion opposite of the first end of the first portion and (ii) a first end of the second portion and a second end of the second portion opposite of the first end of the second portion.

8. The rotating electrical machine according to claim 1, wherein:
the first inlet and the first outlet are separated by 180 degrees in the circumferential direction of the first housing.

* * * * *